No. 623,646. Patented Apr. 25, 1899.
A. S. ADAM.
FOOD GRATING OR SHAVING MACHINE.
(Application filed Oct. 22, 1898.)
(No Model.) 5 Sheets—Sheet 1.
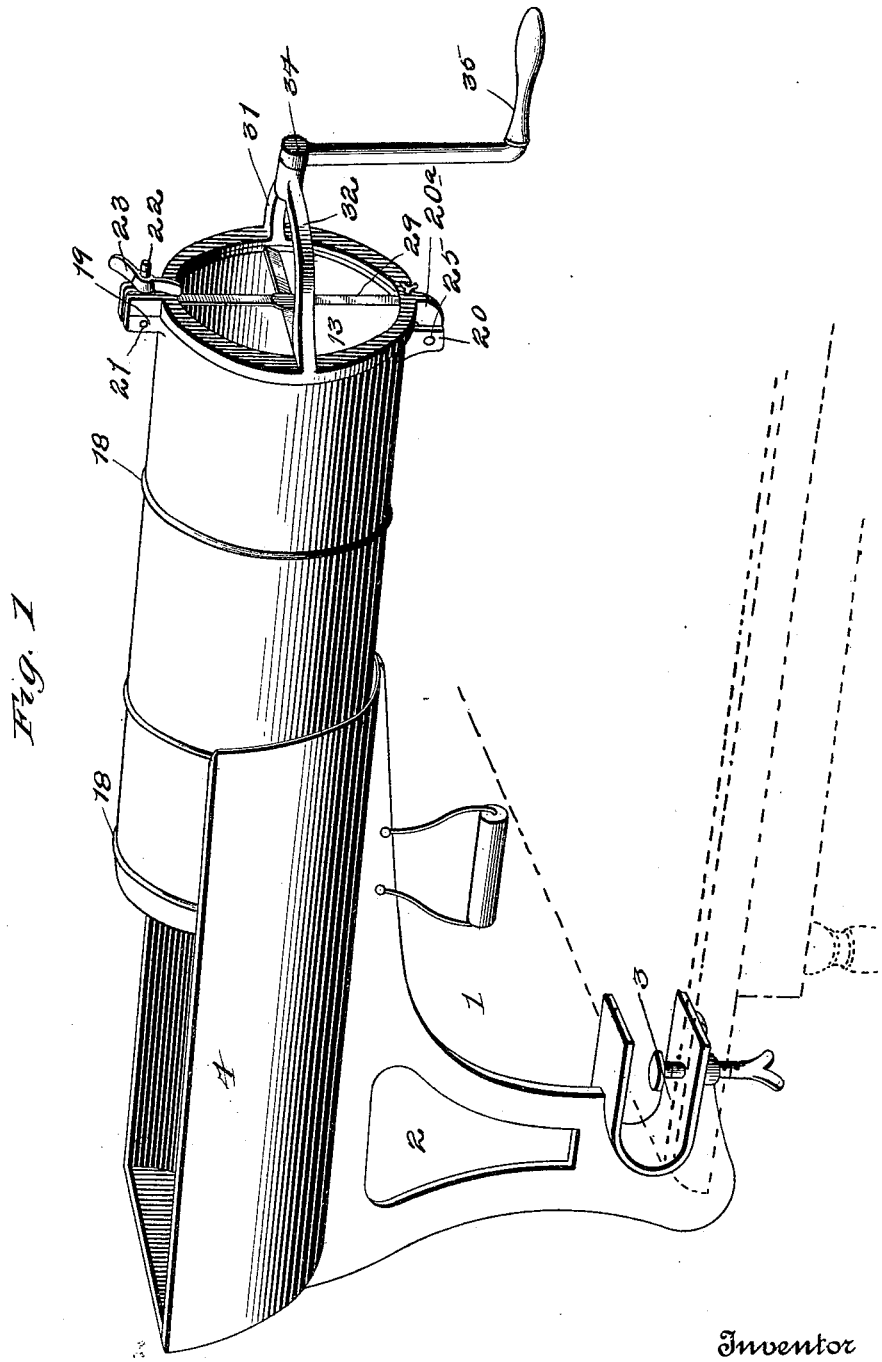
Witnesses
Inventor
Agnes S. Adam

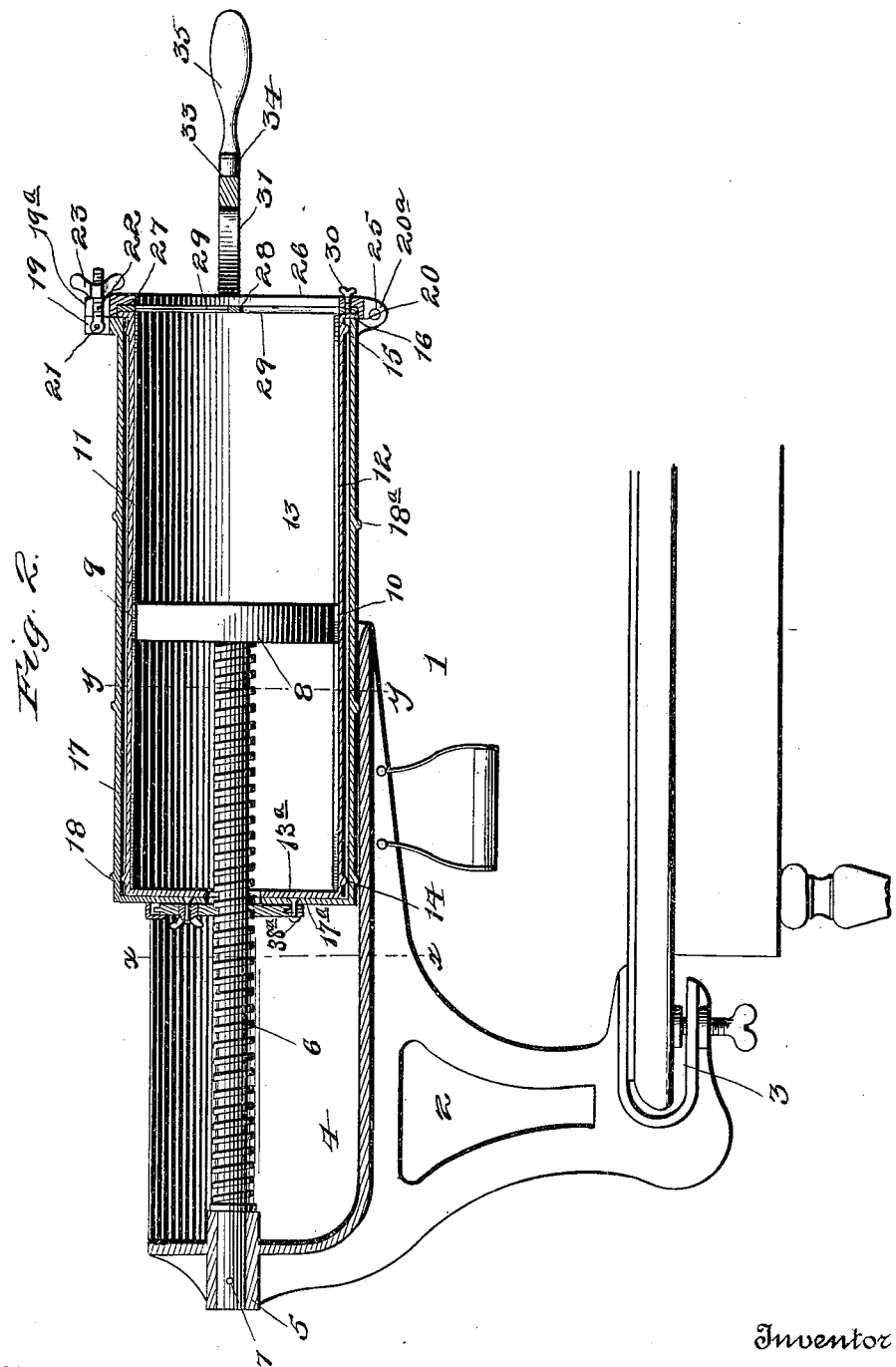

No. 623,646. Patented Apr. 25, 1899.
A. S. ADAM.
FOOD GRATING OR SHAVING MACHINE.
(Application filed Oct. 22, 1898.)
(No Model.) 5 Sheets—Sheet 3.
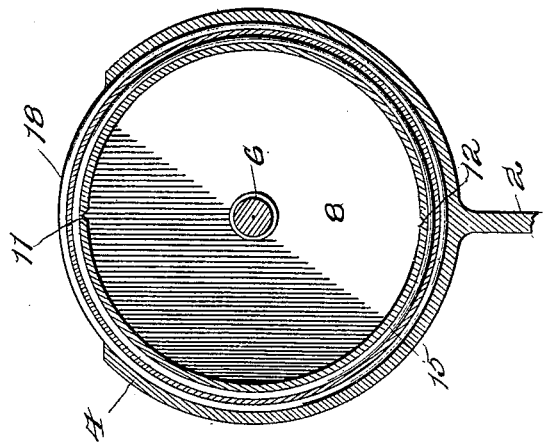
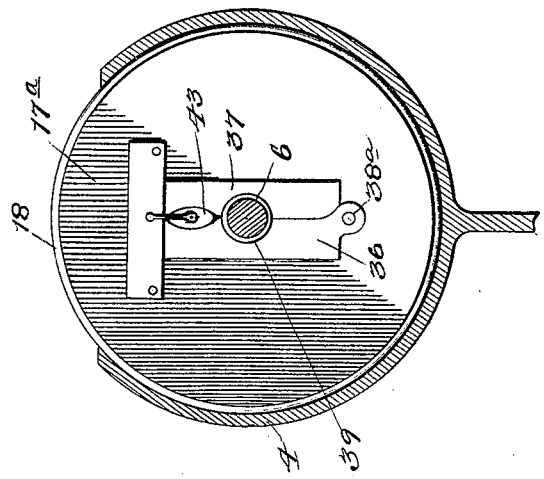
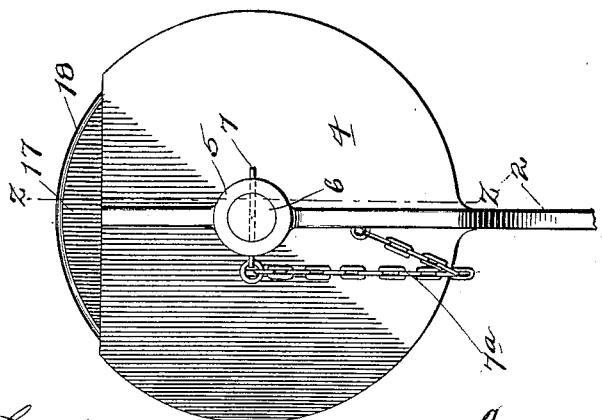
Witnesses
Inventor
Agnes S. Adam No. 623,646. Patented Apr. 25, 1899.
A. S. ADAM.
FOOD GRATING OR SHAVING MACHINE.
(Application filed Oct. 22, 1898.)
(No Model.) 5 Sheets—Sheet 4.
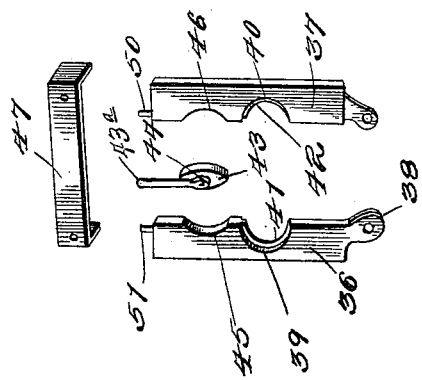
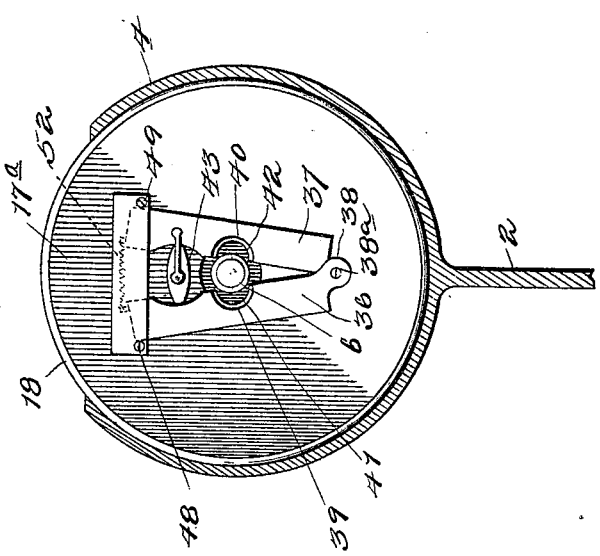
Witnesses
Inventor
Agnes S. Adam No. 623,646. Patented Apr. 25, 1899.
A. S. ADAM.
FOOD GRATING OR SHAVING MACHINE.
(Application filed Oct. 22, 1898.)
(No Model.) 5 Sheets—Sheet 5.
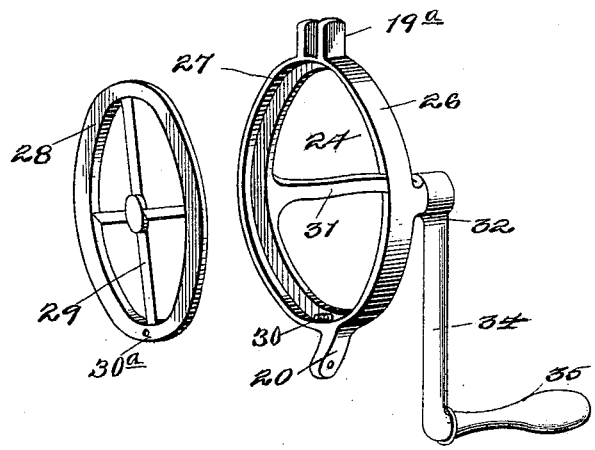
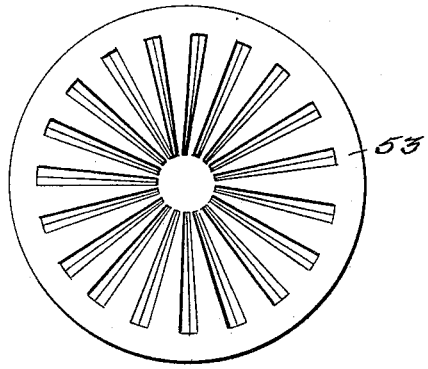
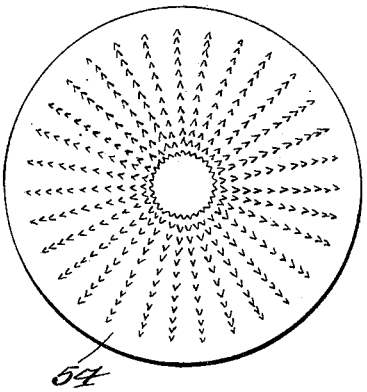
Witnesses
Inventor
Agnes S. Adam

UNITED STATES PATENT OFFICE.

AGNES S. ADAM, OF WASHINGTON, DISTRICT OF COLUMBIA.

FOOD GRATING OR SHAVING MACHINE.

SPECIFICATION forming part of Letters Patent No. 623,646, dated April 25, 1899.

Application filed October 22, 1898. Serial No. 694,353. (No model.)

*To all whom it may concern:*

Be it known that I, AGNES S. ADAM, a citizen of the United States, residing at Washington, in the District of Columbia, have invented a new and useful Food Grating or Shaving Machine, of which the following is a specification.

My invention relates to improvements in food grating and shaving machines in which rotating graters or knives operate in conjunction with a food-containing receptacle and feed mechanism; and the objects of my improvement are, first, to provide a regularly and continuously operating feed mechanism for supplying the food directly to the grater or knife; second, to furnish facilities for the rapid and interchangeable adjustment in the machine of graters or knives having varying degrees of fineness of cut, and, third, to provide means for quickly placing and adjusting the food to be cut in the machine. I attain these objects by the mechanism illustrated in the accompanying drawings, in which—

Figure 1 is a perspective view of the entire machine; Fig. 2, a longitudinal section on the line $z\ z$ of Fig. 3; Fig. 3, a rear elevation with part of the frame broken away; Fig. 4, a view, partly in cross-section and with part of the lower frame broken away, taken on the line $x\ x$ of Fig. 2 and showing feed mechanism engaged; Fig. 5, a cross-section of the machine with the lower part of the frame broken away on the line $y\ y$ of Fig. 2; Fig. 6, a detail section, with part of the lower support broken away, taken on the line $x\ x$, Fig. 2, and showing feed mechanism disengaged; Fig. 7, a detail perspective of the screw-clamps of the feed mechanism with the disengaging and retaining members belonging thereto; Fig. 8, a detail perspective of the cutter-frame, showing a typical example of an interchangeable knife ready to be placed in said frame; Fig. 9, one of the various forms of interchangeable knives adapted to be used in the machine, and Fig. 10 one of the various styles of grater adapted to operate in the mechanism.

Similar numbers refer to similar parts throughout the several views.

The machine 1 has a framework consisting of a vertical support 2, having at its lower end a suitable clamping device 3, designed to be fastened to a table or other substantial object and being provided at its upper end with a recessed channel 4, adapted to contain the operating mechanism.

In the rear end of the channel 4 is formed a bearing 5, wherein a feed worm or screw 6 is rigidly secured by the locking-pin 7. (See Figs. 2 and 3.) To the opposite end of said feed-screw 6 is rigidly secured a disk 8, adapted to smoothly fit the interior of the food-cylinder 13 and provided at the upper and lower sides of its periphery with longitudinal lugs 9 and 10, over which slide the longitudinal grooves 11 and 12 of the food-cylinder 13, as particularly shown in Fig. 5, in such a manner as to admit of the free longitudinal movement, but prevent the rotation of said food-cylinder. The exterior of the food-cylinder 13 is provided with annular antifriction-rings 14 and 15, smoothly fitting the interior of the telescopic cutter-barrel 17, (see Figs. 2 and 5,) which rotates over said interior food-cylinder 13, with its described annular rings 14 and 15, after the manner of a journal turning upon a fixed axle. The exterior of the cutter-barrel 17 is likewise provided with annular rings 18 $18^a$, causing said cutter-barrel to smoothly fit and turn within the channel 4, which latter is made in excess of one hundred and eighty degrees to give it the effect of a circular journal, as clearly shown in Fig. 6. The heads or diaphragms at rear ends of both the food-cylinder 13 and cutter-barrel 17 have central circular apertures sufficiently large to admit of the free passage of said diaphragms over the feed-screw 6 without contact with same. The outward movement of the telescoping cylinder and barrel preparatory to loading food is limited by contact of rear face of disk 8 with the diaphragm $13^a$, and the inward travel of the mechanism in cutting food is limited by contact of the front face of the disk 8 with the knives or grater 29.

The forward end of the food-cylinder 13 bears a small flange 16, projecting outwardly over the forward end of the cutter-barrel 17, enabling free removal of said cylinder upon disengagement of the cutting and feeding mechanisms and release of the locking-pin 7. The outward end of the cutter-barrel 17 carries diametrically opposite bifurcated lugs 19 and 20, interiorly hinged within the latter of which by the pin 25 is the tongue 20ª of the cutter-frame 26. (See Figs. 1, 2, and 8.) Interiorly hinged within the lug 19 by the pin 21 is the screw 22, adapted to enter the bifurcated lug 19ª of the frame 26 and rigidly lock said frame by means of the thumb-nut 23, as shown in Figs. 1 and 2. The cutter-frame 26 is interiorly grooved at 27 to receive the knife or grater frame 28, carrying suitable knives or graters 29, and prevented from rotating in said cutter-frame by the pin 30, fitting the hole 30ª. The cutter-frame 26 exteriorly carries the arms 31 32, forming bearing 33, to which is rigidly attached the winch 34, with its revolving handle 35. The radial knife 53 and grater 54 are optional interchangeable cutters for use in this cutter-frame 26.

The cutter-barrel 17 carries on its inner end the feed-clamping mechanism, which consists of the bifurcated jaws 36 37, hingedly secured by the screw or pin 38ª upon the diaphragm 17ª, said jaws having threads 39 40, fitting the thread of the feed-screw 6, with which they are normally kept in engagement by the tension-spring 52, attached to projections 50 51 at their upper ends and contained beneath the retention-plate 47, fixed by screws 48 and 49 to said diaphragm 17ª. Midway between the feed-screw 6 and retention-plate 47 the elliptic disengaging-cam 43, with its rigidly-attached handle 43ª is rotatively fixed by a screw or pin 44 on the diameter, line passing through the pin 38ª and feed-screw 6 in such manner that by rotating said cam in the bifurcated elliptic sockets 45 and 46 of the clamping-jaws 36 and 37 it forces said jaws apart, disengages their threads from that of the feed-screw 6, and by means of the slightly-flattened ends of said cam 43 locks the entire feed mechanism in disengagement. (See Figs. 2, 6, and 7.)

I do not desire to limit myself to the particular forms given as preferable for the construction of my machine, but reserve the right to use equivalent parts without departing from the spirit of my invention.

Having thus described my machine, its operation is as follows: The feed mechanism is disengaged by a quarter-rotation of the cam 43, the telescoping cylinder and barrel drawn outward along the channel 4, the thumb-screw 22 released by unscrewing its nut 23 and raised, the cutter-frame 26 dropped upon its hinge, the food inserted in the cylinder 13, the cutter-frame raised and reclamped by the screw 22 with its nut 23, the mechanism pushed inward until its contained food is tightly held between the disk 8 and knives or grater 29, the cam 43 rotated back to allow engagement of the clamping-jaws 36 and 37 with the feed-screw 6, and the winch 34 then turned by its handle 35 until the food is cut.

What I claim as my invention, and desire to secure by Letters Patent, is—

1. The combination, in a food grating or shaving machine, of a framework rigidly supporting a longitudinal channel less than circular in cross-section, a feed mechanism, a cutter-barrel turning in said channel and engaging with said feed mechanism, a non-rotative food-cylinder telescoping within said cutter-barrel, a cutter-frame carrying graters or knives and secured to said cutter-barrel, and means for rotating said cutter-frame, substantially as described.

2. The combination, in a food grating or shaving machine, of a framework rigidly supporting a longitudinal channel less than circular in cross-section, a non-rotative feed-screw rigidly but removably secured at one end to said framework and having fixed to its opposite end a disk with peripheral, longitudinal lugs or guides, a non-rotative food-cylinder working exteriorly over said disk and interiorly engaging with said lugs or guides, a rotative cutter-barrel telescoping over said food-cylinder and engaging with said feed-screw, a cutter-frame secured to said cutter-barrel, knives or graters secured in said cutter-frame and means for rotating said cutter-frame, substantially as described.

3. The combination in a food grating or shaving machine of a framework rigidly supporting a longitudinal channel less than circular in cross-section, a feed mechanism, a food cylinder or receptacle, annular antifriction-rings on the exterior of said food cylinder or receptacle, a cutter-barrel telescoping over said food cylinder or receptacle and bearing or turning upon the outer periphery of aforesaid annular antifriction-rings, and annular antifriction-rings exteriorly fixed or made upon said cutter-barrel in such manner as to revolve in contact with, and spirally traverse the interior surface of said longitudinal channel, substantially as and for the purposes described.

4. The combination in a food grating or shaving machine of a framework rigidly supporting a longitudinal channel less than circular in cross-section, a non-rotative feed-screw secured at one end to said framework, and at the other end to a disk internally fitting and registering by means of lugs or guides within a non-rotative food-cylinder, a cutter-barrel telescoping over said food-cylinder, an interiorly-threaded bifurcated clamp or nut secured to said cutter-barrel and adapted to engage with said feed-screw and means for releasing said bifurcated clamp or nut from engagement with said feed-screw, substantially as described.

5. The combination in a food grating or shaving machine, of a suitable framework supporting the general mechanism, a non-rotative feed-screw, means for rigidly but removably attaching said screw to said framework, a bifurcated interiorly-threaded clamp or nut adapted to engage said feed-screw, a cylindric cutter-barrel having an interiorly-telescoping food-receptacle, means for hingedly attaching said bifurcated clamp or nut to said cutter-barrel, a spring or springs attached to and adapted to keep the halves of said clamp or nut normally in engagement with said feed-screw, and means for disengaging, and locking in disengagement from said feed-screw the said bifurcated clamp or nut, substantially as described.

6. The combination in a food grating or shaving machine, of a suitable framework supporting the general mechanism, a feed mechanism, a food cylinder or receptacle, a cutter-barrel telescoping over said food cylinder or receptacle, a cutter-frame hingedly attached to said cutter-barrel and adapted to be clamped shut over the mouth of same and interchangeable frames carrying fixed knives or graters adapted to be removably attached to or secured within said cutter-frame, substantially as and for the purposes described.

7. The combination, in a food grating or shaving machine, of a suitable framework supporting the general mechanism, a feed mechanism, a food cylinder or receptacle, a cutter-barrel telescoping over said food cylinder or receptacle, a cutter-frame hingedly attached to said cutter-barrel and adapted to be clamped shut over the mouth of same, interchangeable frames carrying fixed knives or graters, adapted to be removably attached to or secured within said cutter-frame, arms projecting rigidly from said cutter-frame to form a bearing and a winch rigidly secured to said bearing in such a manner as to adapt it to actuate said frame with its attached cutter-barrel, substantially as and for the purposes described.

8. The combination, in a food grating or shaving machine, of a suitable framework supporting the general mechanism, a feed mechanism, a food cylinder or receptacle, a cutter-barrel telescoping over said food cylinder or receptacle, a cutter-frame hingedly attached to said cutter-barrel and adapted to be clamped shut over the mouth of same, interchangeable frames carrying fixed knives or graters adapted to be removably attached to or secured within said cutter-frame, and suitable means for clamping said cutter-frame with its contained or attached knives or graters over the mouths of said telescoping cylinder and barrel, substantially as and for the purposes described.

9. In a food grating or shaving machine, the combination of a food-cylinder, a cutter-barrel concentric thereto and telescopically connected therewith, so as to move longitudinally in relation thereto, a feed mechanism, and grating mechanism.

10. In a food grating or shaving machine, the combination of a non-rotative food-cylinder, a rotative and longitudinally-movable cutter-barrel telescopically connected to the food-cylinder, a feed mechanism, and grating mechanism.

11. In a food grating or shaving machine, the combination of a fixed food-cylinder, a cutter-cylinder longitudinally movable thereon, a fixed feed screw and disk, and a grating mechanism.

12. In a food grating or shaving machine, the combination of a food-cylinder having external antifriction-rings, a cutter-barrel concentric thereto and telescopically connected therewith, a feed mechanism, and grating mechanism.

13. In a food grating or shaving machine, the combination of a trough-like support, a food-cylinder having external antifriction-rings, a cutter-barrel surrounding said cylinder, movable thereon and provided with antifriction-rings engaging said support, a feed mechanism, and grating mechanism.

AGNES S. ADAM.

Witnesses:
JOHN F. HUBBARD,
JOHN W. CAMPBELL.